United States Patent Office 3,496,099
Patented Feb. 17, 1970

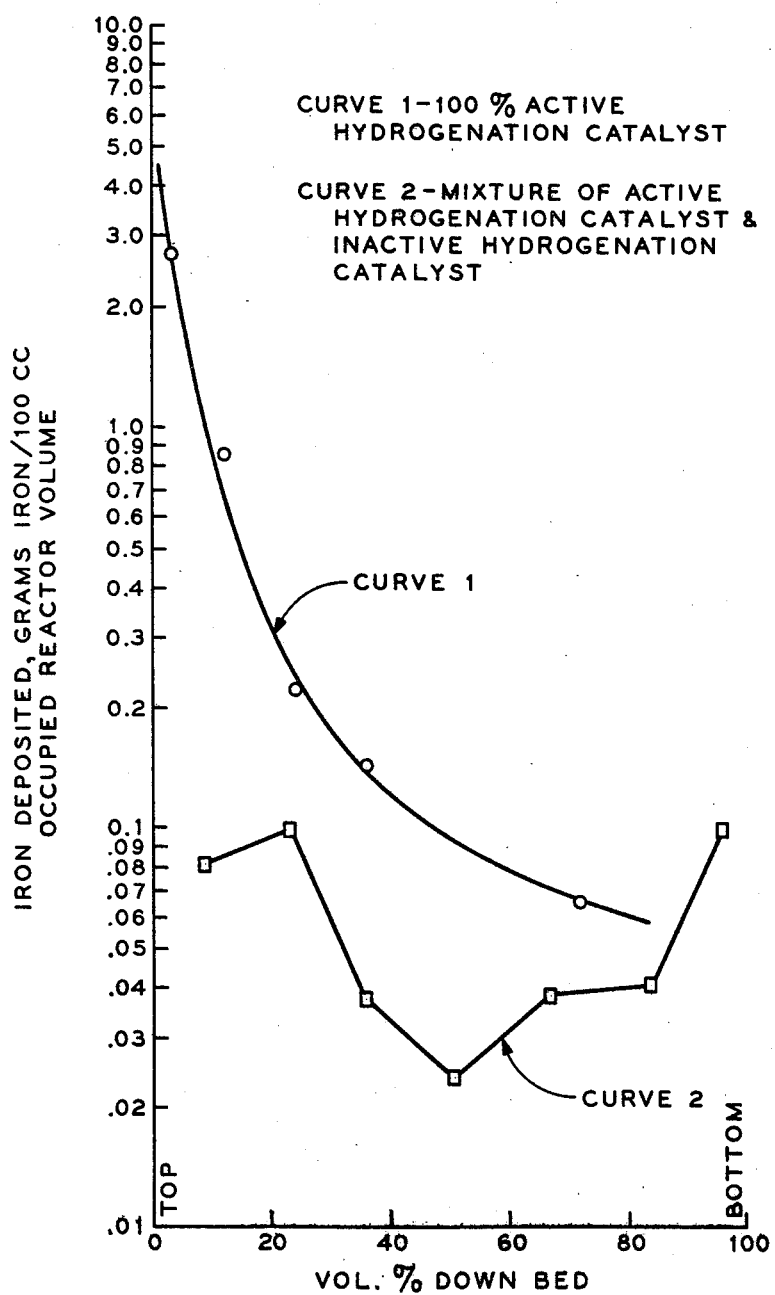

3,496,099
METALS REMOVAL
Alan G. Bridge, El Cerrito, Calif., assignor to Chevron Research Company, San Francisco, Calif., a corporation of Delaware
Continuation-in-part of application Ser. No. 668,046, Sept. 15, 1967. This application July 9, 1968, Ser. No. 743,568
Int. Cl. C10g 23/00, 13/00
U.S. Cl. 208—251
9 Claims

ABSTRACT OF THE DISCLOSURE

Process for removing metals from a hydrocarbon feed containing organometallic compounds, using a fixed catalyst bed but yet avoiding rapid pressure drop buildup and catalyst plugging, which comprises passing the hydrocarbon feed together with hydrogen through a catalyst bed which has increasing hydrogenation catalytic activity along the direction of flow of the feed through the catalyst bed.

CROSS REFERENCE TO RELATED APPLICATION

This application is a continuation-in-part of my application Ser. No. 668,046, filed Sept. 15, 1967.

BACKGROUND OF THE INVENTION

Field of the invention

This invention relates to the removal of metal compounds from petroleum crude oils and various hydrocarbon fractions derived therefrom. More specifically, this invention is directed toward removal of metal compounds from petroleum crude oils, atmospheric tower bottoms products, vacuum tower bottoms products, solvent deasphalted vacuum tower bottoms, heavy cycle stocks, oils from tar sands, etc. in a hydrogenation process using a fixed bed containing hydrogenation catalyst particles.

Prior art

Petroleum crude oil, and the other hydrocarbon fractions mentioned above often contain organometallic contaminants which cause deleterious effects in various catalytic processes to which the heavy hydrocarbon fraction may be subjected. The more common of the metallic contaminants are iron, vanadium and nickel, often existing in concentrations in excess of 50 p.p.m. Other metals, including sodium, copper, etc., may also be present. These metals may exist within the hydrocarbon distillate and residuum fractions in a variety of forms; they may exist as metal oxides or as sulfides introduced therein as a form of metallic scale; they may be present in the form of soluble salts of such metals; usually, however, they are present in the form of high molecular weight organometallic compounds including metal porphyrins, metal naphthenates and the various derivatives of the porphyrins and naphthenates.

The forms the soluble metallic compounds may assume in oils, particularly residual oils, are not known with certainty. One general form for a metallic porphyrin may be represented as follows for iron:

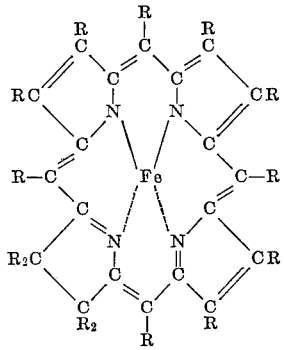

Another type of soluble organometallic compounds found in oils, particularly residual oils, are the metal naphthenates. One general form for the metal naphthenates may be represented as follows for iron:

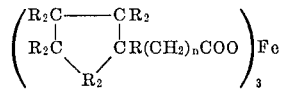

where $n$ may be zero but generally is an integer between 1 and 5, and R is hydrogen or an alkyl group.

Although metallic contaminants, existing as oxide or sulfide scale, may be removed, at least in part by a relatively simple filtering technique, and the water soluble salts are at least in part removable by washing and a subsequent dehydration procedure, a much more severe treatment is required to effect the destructive removal of the organometallic compounds, particularly to the degree which is necessary to produce a heavy hydrocarbon fraction suitable for further processing. Examples of further processing wherein it is desired to have a low metals content or essentially metal-free feed include catalytic cracking and various hydrogenation processes such as hydroisomerization, hydrotreating and hydrocracking.

Although there have been numerous methods proposed in the past for removing these metallic contaminants from high boiling petroleum fractions, it has been found that such methods are largely ineffective, generally result in the loss of substantial quantities of the oil, and in most cases are prohibitively expensive. For example, in hydrorefining a solvent-deasphalted oil containing only about 4 p.p.m. iron, 11 p.p.m. nickel and 3.5 p.p.m. vandium, the fixed bed of catalyst used became plugged (i.e., the pressure drop became excessively high) with deposited metallic compounds after three months' operation. As a result, it has generally been necessary to restrict the streams fed to catalytic petroleum processing units, particularly those employing fixed beds of catalyst, to those fractions which boil below the range in which the contaminants are found.

THE INVENTION

According to the present invention, iron and/or other metals are removed from a hydrocarbon feed containing organometallic compounds, using a fixed catalyst bed and reducing pressure drop buildup and catalyst plugging, by a process which comprises passing the hydrocarbon feed together with hydrogen through a catalyst bed which has increasing hydrogenation catalytic activity along the direction of flow of the feed through the bed.

In a preferred embodiment of the present invention, the hydrocarbon fed containing organometallic compounds is passed, together with hydrogen, through a catalyst bed which is a mixture of active hydrogenation catalyst particles and particles inactive for hydrogenation, said catalyst bed having an increasing volume percent ratio of active hydrogenation particles to inactive particles along the direction of flow of the hydrocarbon feed through the catalyst bed.

In the present invention, the feed is usually a heavy oil fraction, a substantial part of which boils above 900° F. The feed typically contains at least 1 p.p.m. metals and generally more than 4 p.p.m. metals, such as calcium, arsenic, sodium, iron, vanadium and nickel. The present invention is particularly advantageously applied to hydrocarbon feedstocks containing one or more parts per million by weight as iron of oil soluble iron compounds.

The heavy oil fraction is passed through the catalyst bed at a temperature between 400°–900° F., preferably between 600°–850° F., and a pressure between 200 p.s.i.g. and 5000 p.s.i.g., preferably between 900 p.s.i.g. and 2000 p.s.i.g. Because the present invention avoids formation of a high pressure drop plug due to metals deposited at the top of the bed, very high metals content feeds may be processed, such as resids containing several hundred parts per million metals.

It has been found that iron deposits preferentially in the interstices, i.e., void volume, betwen the catalyst particles, particularly at the top of the hydrogenation catalyst bed, whereas vanadium and nickel deposit preferentially within the catalyst pores, i.e., inside the catalyst particles. In spite of this, surprisingly it has been found that not only metals from organometallic compounds of the class vanadium and nickel are distributed approximately uniformly throughout the bed when the fixed catalyst bed is tailored in accordance with the present invention, but also that iron deposits approximately uniformly throughout the tailored bed. Using the tailored catalyst bed, the iron does not form a high pressure drop plug across the entrance cross section of the catalyst bed after only a short period of on-stream time as is the case with fixed beds used heretofore in hydroconversion of iron-contaminated oils. In this patent application, the term "plug" is used to connote a substantial increase, generally at least an increase of 50%, in the pressure drop across the bed versus what the pressure drop was across the bed before the metals-containing feed was passed through the bed. Because of the increased pressure drop, fluid flow is substantially hindered.

According to a preferred embodiment of the present invention a process is provided for removing metals from a heavy coil which comprises passing the heavy oil at a temperature between 600 and 850° F. and a pressure above 400 p.s.i.g., preferably about 1500 p.s.i.g., together with hydrogen through a fixed bed of a mixture of inactive particles and active hydrogenation catalyst particles wherein the heavy oil entrance one-third fraction of the fixed bed contains an average of less than 40 volume percent active hydrogenation catalyst particles, preferably about 25%; the central one-third fraction of the fixed bed contains an average of less than 80 volume percent active hydrogenation catalyst particles, preferably about 50%; and the exit one-third fraction of the fixed bed contains an average of between 50 to 100 volume percent active hydrogenation catalyst, preferably about 70%. The amount of hydrogen passed through the bed together with the oil feed may be between 200 and 9000 s.c.f. per barrel of oil, preferably between 500 and 5000 s.c.f. of $H_2$ per barrel of oil.

Since it has been found that iron deposits in the interstices between the catalyst particles and further found that the amount deposited can be controlled by the amount of active hydrogenation catalyst of a given size per unit volume of interstitial void volume, as indicated above, a particular embodiment of the present invention is to tailor or grade the catalyst bed so as to provide a decreasing amount of interstitial void volume down the bed in the direction of oil flow. Thus the bed is tailored so as to provide more interstitial volume for iron deposits at the top of the bed than at the lower part of the bed. In this embodiment of the invention, hydrogenation catalysts of the same composition may be used throughout the bed; but the particle size or configuration of the catalyst is varied from top to bottom of the bed to provide decreasing interstitial voidage volume along the normal direction of oil flow through the bed.

Although the bed may be tailored to provide decreasing voidage volume down the bed, this is not as satisfactory a solution to the iron deposition problem as is tailoring of the bed with respect to hydrogenation catalytic activity of the particles. Hydrogenation catalytic activity is preferably increased through the bed along the direction of feed flow by composing the bed of progressively smaller particle size catalyst along the direction of feed flow, small catalyst particles generally being more active than larger particles; and, in addition, the catalytic activity for effecting hydrogenation reactions is increased by varying the composition of crystalline structure of the catalyst. For example, it has been found that nickel and molybdenum compounds on silica-alumina or alumina supports are generally more active for hydrogenation than nickel and tungsten on a comparable support. However, nickel and tungsten on a silica-alumina or alumina support are generally more active for hydrogenation than about the same weight percent cobalt and molydbenum on a comparable support. Preferably, the topmost layer of catalyst in the bed or series of beds is of no more than 50% of the hydrogenation activity of presently (1968) commercially available nickel-molybdenum hydrogenation catalysts. That is, the catalyst in the topmost volumetric position should not be a highly active hydrogenation catalyst.

In this patent application, by hydrogenation activity is meant the ability to effect hydrogenation conversion reactions at a given temperature, particularly hydrogenation conversion reactions such as the conversion of organic nitrogen compounds to ammonia and hydrocarbons.

BRIEF DESCRIPTION OF THE DRAWING

FIGURE 1 is a graph which shows a comparison of a tailored catalyst bed to a nontailored catalyst bed; curve 1 of FIGURE 1 shows the profile for iron deposits in a catalyst bed used in hydroconversion of the heavy, metals-containing oil according to the prior art; curve 2 of FIGURE 1 shows the profile for a catalyst bed of the same cross-sectional area and length as in curve 1; but the catalyst bed used to obtain curve 2 had been tailored in accordance with the invention as further discussed below.

DETAILED DESCRIPTION

Referring now in more detail to FIGURE 1, the ordinate shows the grams of iron deposited per 100 cubic centimeters of catalyst and/or inert particles, i.e., per 100 cc. of internal reactor volume occupied by the particles. Thus, in the 100 cc. of internal reactor volume occupied by particles there is some interstitial voidage volume not actually physically displaced by the particles. By interstitial voidage is meant the voidage in between the several particles as they lie in the bed. The abscissa in FIGURE 1 shows the position in the catalyst bed starting from the top at the left and moving to the bottom of the bed at the right. Feed to the catalyst bed was solvent deasphalted California oil containing 2.9 parts per million iron, 6.5 p.p.m. nickel and 2.6 p.p.m. vanadium by weight as metals. The catalyst used to obtain curve 1 shown in FIGURE 1 was an active hydrogenation catalyst. For the purposes of this invention, by active catalyst or active hydrogenation catalyst is meant a particle which is active for the hydrogenation of hydrocarbons and/or inorganic substances associated with the hydrocarbons. Thus active hydrogenation catalysts as the term is used herein include catalysts which catalyze the reaction of hydrocarbons and/or associated inorganic material with hydrogen, including for example, reactions occurring in hydrocracking, hydrotreating, hydrofining, etc. Some typical hydrocarbon hydrogenation reactions which are effected in the presence of a hydrogenation catalyst are shown in Table I below:

TABLE I

Sulfur conversion to hydrogen sulfide

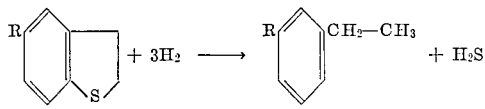

Nitrogen conversion to ammonia

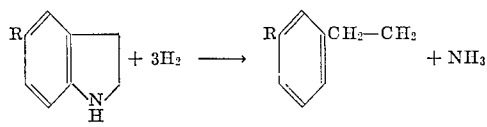

Metal elimination

Organometallic of $+H_2$, Ni, Vn, Fe, Cu, etc.→Hydrocarbon+metal adsorbed in and/or on catalyst Saturation:
 Olefinic bonds

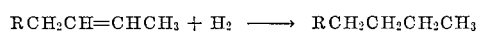

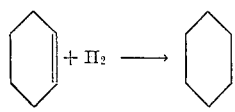

Aromatic Bonds

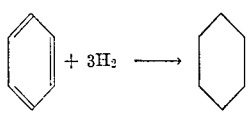

Hydrocracking:
 Paraffins

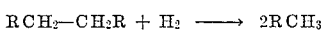

Dealkylation

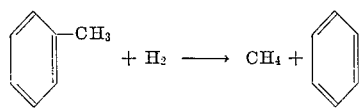

Ring opening

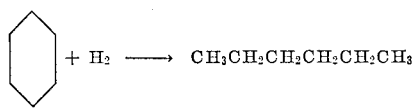

Hydroisomerization:
 Paraffins and naphthenes

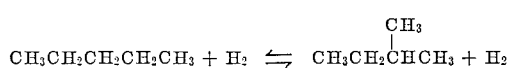

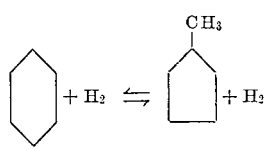

Generally, hydrogenation catalysts include one or more of the metals of Groups V, VI and VIII of the Periodic Table and the oxides or sulfides of these metals. The more important of these metals are chromium, molybdenum, tungsten, cobalt and nickel. While these metals or metal compounds may be used alone, it is the usual practice to employ catalysts which comprise one or more of these metals or metal compounds deposited on a suitable support such as activated alumina, kieselguhr, silica-alumina composites containing a minor proportion of silica, activated clays, and the like. A particularly valuable support is an activated alumina containing a relatively small amount of silica, for example about 5 percent by weight, which serves to improve the surface characteristics of the support.

The size of the catalyst particles or inert particles used in the present invention include small particles, for example extrudate having a diameter of about 1/16 inch to 3/16 and having an L/D (length to diameter ratio) between 0.5 and 4.0; and larger particles, for example, 3/16 to 5/16 inch extrudate having an L/D between 0.5 and 4.0.

The shape of the particles used in the present invention may vary considerably, including, for example, cylindrical or hollow core particles. Thus a particle in the shape of raschig ring may be used. The shape as well as the size of the particles may be used to obtain different amounts of interstitial voidage in the bed of particles. For example, one-fourth inch outside diameter raschig ring-shaped particles with a center hole of about one-eighth inch diameter have an external void fraction of 0.62 cubic centimeter per cubic centimeter of particles, compared with 0.35 cubic centimeter of void volume per one cubic centimeter of particles for one-eighth inch cylindrical extrudate.

Referring again specifically to curve 1 of FIGURE 1, the type of catalyst used consisted essentially of sulfided nickel and molybdenum deposited on an alumina support. The solvent deasphalted oil and hydrogen were passed together across the bed of catalyst at a temperature of about 725° F. and a pressure of about 2400 p.s.i.g. The depth of the catalyst bed was 12 inches and the cross sectional flow area was 0.8 square inch. The particle size of the catalyst used in the bed was 8–14 mesh. The amount of hydrogen passed through the bed with the oil was about 5000 s.c.f. per barrel of oil. After 920 hours of operation, the pressure drop across the catalyst bed had increased substantially and the run was shut down. The material deposited in the catalyst bed was analyzed, and iron sulfide was found to be the largest interstitial constituent. The deposited iron was plotted, thereby forming the curve shown as curve 1. As can be seen from this curve, there was a relatively large concentraton of the deposit in the first 10 to 20 percent of the catalyst bed.

Referring now to curve 2 shown in FIGURE 1 the same ordinate and abscissa scale are used as for curve 1. However, for curve 2 the ordinate is grams of iron per 100 cc. of mixture of active hydrogenation catalyst and inactive hydrogenation catalyst instead of grams of iron per 100 cc. of active hydrogenation catalyst as for curve 1. By inactive hydrogenation catalyst is meant those catalysts having relatively low activity for hydrogenation compared to the various commonly used hydrogenation catalysts. The term inactive hydrogenation catalyst or inactive particles is meant to include materials that are essentially completely inert with respect to hydrogenation. At elevated temperatures and pressures (for example, above 400° F. and 450 p.s.i.g.), some materials which are not considered in the art to be good (active) hydrogenation catalysts have slight activity for hydrogenation. For example, the inactive hydrogenation particles used for the catalyst bed from which the data was obtained for curve 2 consisted of silica-alumina which has slight hydrogenation activity. Generally speaking, the particles inactive for catalyzing hydrogenation reactions are components having nil or only small amounts by weight of the metals of Groups V, VI and VIII of the Periodic Table or are composites having little of these metals or their compounds available as active catalyst sites. The active hydrogenation catalyst used to obtain curve 2 was the same as in curve 1, i.e., nickel-molybdenum on alumina, and this catalyst has considerably more hydrogenation activity than the silica-alumina particles. The catalyst bed used in curve 2 was tailored as is indicated in Table II. Segments of the bed starting from the top are indicated.

TABLE II

| | Active Hydrogenation Catalyst (cc.) | Particles Inactive to Catalyze Hydrogenation Reactions (cc.) | Percent Active Hydrogenation Catalyst |
|---|---|---|---|
| Position in Bed Starting From Top: | | | |
| 0-40 cc | 2 | 38 | 5 |
| 40-80 cc | 5 | 35 | 12.5 |
| 80-100 cc | 7 | 14 | 35 |
| 100-200 cc | 14 | 6 | 70 |
| 120-130 cc | 10 | | 100 |
| | 38 | 88 | |

The length of the run made to obtain the data for curve 2 was the same as that for curve 1, 920 hours. The temperature was 725° F. and the liquid hourly space velocities were the same for both the curve 2 run and the curve 1 run.

As can be seen from curve 2, the tailored catalyst bed was successful in reducing the amount of iron deposited in the first 10-20 percent of the bed by approximately an order of magnitude less than what the deposited iron was before the bed was tailored. In general, it is seen a much more uniform concentration of deposited iron was obtained with the tailored catalyst bed. The result was that the pressure drop did not build up rapidly as it did in the curve 1 run. Therefore, the curve 2 run could be continued at economic pressure drop levels for a considerably longer length of time while taking out as much or more iron and other metals than was taken out in the curve 1 run. Other common metals present in the feed were nickel and vanadium. These metals follow the same type curves as in curve 1 and curve 2 for the respective curve 1 run and curve 2 run.

As a further example on the present invention, results obtained for hydrotreating a metals-containing oil in a multiple bed reactor wherein the first beds through which the oil passed were not tailored is compared to results obtained for the same operation but with tailoring of the top beds. The feedstock in both instances was solvent deasphalted residual oil containing about 4 to 7 parts per million iron compounds (on iron basis). The top two beds of the reactor in the case of the untailored beds contained only one catalyst, one-eighth inch extrudate nickel-molybdenum on silica-alumina. The pressure drop across the top bed increased from 2 p.s.i. to 32 p.s.i. after about 1600 pounds of iron had been removed from the feedstock as deposits in the first and second catalyst beds. Because of the high pressure drop resulting from the deposition of iron and other material, it was necessary to shut down the reactor in order to replace or clean the catalyst, even though the activity of most of the catalyst had not declined substantially.

Subsequently the two top beds in the reactor were tailored so as to obtain increasing hydrogenation catalytic activity through the beds in the normal (in this case, downward) direction of oil flow through the bed. Specifically, using as a basis of 100% hydrogenation activity the nickel-molybdenum on silica-alumina catalyst used in the prior run, the tailored bed had the following relative hydrogenation activity profile: top four feet of top bed, 22%; next two feet of top bed, 31%; top two feet of second bed, 31%; next four feet of second bed, 65%; next two feet of second bed, 100%. The catalyst used for the top four feet of the top bed was cobalt-molybdenum on silica-alumina, 3/16 inch cylindrical tablets. The top two beds in this run removed about 2,930 pounds of iron before the pressure drop reached about 30 p.s.i. across the top bed. Thus using the process of the present invention about 83% more iron was removed than in the first run before the pressure drop approached that of the first run.

Although various specific embodiments of the invention have been described and shown, it is to be understood that they are meant to be illustrative only and not limiting. Certain features may be changed without departing from the spirit or essence of the invention. It is apparent that the invention has broad application to the hydrodemetalation of hydrocarbons. Accordingly, the invention is not to be construed as limited to the specific embodiments illustrated but only as defined in the following claims.

I claim:
1. A process for removing iron from a hydrocarbon feed containing iron as an organometallic compound, using a fixed catalyst bed and reducing the rate of pressure drop buildup and catalyst plugging, which comprises passing the hydrocarbon feed together with hydrogen through a fixed catalyst bed which has increasing hydrogenation catalytic activity along the normal direction of feed flow through the bed.

2. A process for removing iron from a hydrocarbon feed containing iron as an organometallic compound, using a fixed catalyst bed and reducing the rate of pressure drop buildup aand catalyst bed plugging, which comprises passing the hydrocarbon feed together with hydrogen through a catalyst bed which is comprised of a mixture of active hydrogenation catalyst particles and inactive particles, said mixture having increasing volume percents of active hydrogenation particles in volume fractions of the catalyst bed along the direction of flow of the feed through the catalyst bed.

3. A process as in claim 1 wherein the hydrocarbon feed is a heavy oil fraction containing at least 1 p.p.m. metals, such as calcium, sodium, iron, vanadium and nickel and the heavy oil fraction is passed through the catalyst bed at a temperature between 400° F. and 900° F. and a pressure between 200 p.s.i.g. and 5,000 p.s.i.g.

4. A process for removing iron from a hydrocarbon feed containing organometallic compounds, using a fixed catalyst bed and reducing the rate of pressure drop buildup and catalyst plugging, which comprises passing the hydrocarbon feed at elevated temperature and pressure together with hydrogen through a catalyst bed which is comprised of a mixture of relatively small hydrogenation catalyst particles and relatively large hydrogenation catalyst particles, which large hydrogenation catalyst particles afford more interstitial voidage upon packing together in the catalyst bed than do the smaller catalyst particles, the ratio of small to large catalyst particles increasing along the direction of flow of the hydrocarbon feed through the catalyst bed.

5. A process for removing metals from a heavy oil which comprises passing the heavy oil at a temperature between 600 and 850° F. and a pressure above 200 p.s.i.g. together with hydrogen through a fixed bed of a mixture of inactive particles and active hydrogenation catalyst particles wherein the heavy oil entrance end one-third fraction of the fixed bed contains an average of less than 40 volume percent active hydrogenation catalyst particles, a central one-third fraction of the fixed bed contains an average of less than 80 volume percent active hydrogenation catalyst particles, and a remaining heavy oil exit one-third fraction of the fixed bed contains an average of between 50 to 100 volume percent active hydrogenation catalyst, wherein said inactive particles afford interstitial space in which metals present in the heavy oil are deposited due to reactions catalyzed by the active hydrogenation catalyst particles.

6. A process according to claim 1 wherein the hydrocarbon feed is a residual oil selected from the group consisting of reduced crude, vacuum distillation residuum, solvent deasphalted reduced crude, solvent deasphalted vacuum residuum and mixtures thereof.

7. A process according to claim 1 wherein the hydrocarbon feed containing organometallic compounds together with hydrogen is passed through the fixed bed at a temperature between 600 and 850° F., a pressure between 200 and 5000 p.s.i.g. and a liquid hourly space velocity between 0.1 and 10.0.

8. A process according to claim 1 wherein the catalyst bed is tailored with respect to both (a) interstitial void volume between the particles by varying the size or configuration of the particles in the bed so as to provide decreasing interstitial voidage through the bed along the normal direction of feed flow, and (b) catalytic activity for effecting hydrogenation reactions so as to provide increasing catalytic hydrogenation activity through the bed along the normal direction of feed flow.

9. A process according to claim 1 wherein the hydrogenation catalytic activity is increased through the bed along the direction of feed flow by composing the bed of progressively smaller particle size catalyst along the direction of feed flow and also progressively more active hydrogenation catalyst compositions along the direction of feed flow through the bed.

References Cited

UNITED STATES PATENTS

| Re. 25,770 | 4/1965 | Johanson. | |
| 3,183,178 | 5/1965 | Wolk | 208—58 |
| 2,943,040 | 6/1960 | Weisk | 208—91 |
| 2,956,004 | 10/1960 | Conn et al. | 208—91 |
| 3,073,777 | 1/1963 | Oettinger | 208—59 |

DELBERT E. GANTZ, Primary Examiner

J. M. NELSON, Assistant Examiner

U.S. Cl. X.R.

260—668, 676, 683.9